United States Patent
Portman et al.

(10) Patent No.: US 6,944,447 B2
(45) Date of Patent: Sep. 13, 2005

(54) LOCATION-BASED SERVICES

(75) Inventors: Eric A. Portman, Norcross, GA (US); Michael L. Gailey, Dunwoody, GA (US); Chad S. Holmes, Atlanta, GA (US); Michael J. Burgiss, Smyrna, GA (US); Angela King Smith, Atlanta, GA (US); Ashton F. Pitts III, Redondo Beach, CA (US); Stephen L. Dempsen, Redondo Beach, CA (US); Vinny Wai-yan Che, Alhambra, CA (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/946,111

(22) Filed: Sep. 4, 2001

(65) Prior Publication Data

US 2002/0160766 A1 Oct. 31, 2002

Related U.S. Application Data

(60) Provisional application No. 60/286,196, filed on Apr. 27, 2001.

(51) Int. Cl.$^7$ ............................................. H04Q 7/20
(52) U.S. Cl. .................... 455/422.1; 455/463; 455/466; 455/433; 455/434; 455/414.2; 455/564; 455/445; 455/456.3; 709/218; 709/216; 709/217
(58) Field of Search ...................... 455/422.1, 456.3, 455/414.2, 445, 466, 564, 76, 433, 434, 463, 422, 435, 576, 569, 575, 414; 709/218, 216, 217, 219

(56) References Cited

U.S. PATENT DOCUMENTS

| 5,625,668 | A | * | 4/1997 | Loomis et al. ................. 379/58 |
| 5,764,731 | A | * | 6/1998 | Yablon ......................... 379/88 |
| 6,076,099 | A | | 6/2000 | Chen et al. |
| 6,091,956 | A | | 7/2000 | Hollenberg |
| 6,199,099 | B1 | | 3/2001 | Gershman et al. |
| 6,317,718 | B1 | | 11/2001 | Fano |
| 6,418,216 | B1 | * | 7/2002 | Harrison et al. ........ 379/208.01 |
| 6,560,456 | B1 | * | 5/2003 | Lohtia et al. ................ 455/445 |
| 2001/0044309 | A1 | | 11/2001 | Bar et al. |
| 2002/0090934 | A1 | | 7/2002 | Mitchelmore |

* cited by examiner

*Primary Examiner*—Nick Corsaro
*Assistant Examiner*—Shaima Q. Aminzay
(74) *Attorney, Agent, or Firm*—Brinks Hofer Gilson & Lione (57) ABSTRACT

The present invention discloses a method and system for providing location-based services to a remote terminal that is connected to various types of communication systems. A tailored request for information is generated with the remote terminal. In addition, a geographic indicator associated with the remote terminal is also generated in the preferred embodiment. The tailored request for information and the geographic indicator are transmitted to a location-based application server. A structured response to the tailored request for information is generated with the location-based application server, wherein the structured response is based on the geographic indicator of the remote terminal. The structured response is the transmitted to the remote terminal using one of several different types of communication protocols and/or mediums.

52 Claims, 2 Drawing Sheets

LOCATION-BASED SERVICES

This application claims the benefit of U.S. Provisional Application Ser. No. 60/286,196, filed Apr. 27, 2001.

FIELD OF THE INVENTION

The present invention relates generally to providing information to communication devices and, more particularly, to providing location-based services targeted toward communication devices located in specific geographic areas.

BACKGROUND OF THE INVENTION

Wireless communication devices have recently evolved from a technology used by an elite segment of the population to a technology that is used by the masses. In the year 2000, it has been estimated that well over 100 million people in the United States alone subscribed to at least one type of wireless communication service. Worldwide, the number of wireless communication device users has reached a staggering number and is growing all of the time. In the near future, it is envisioned that almost everyone will own or use some sort of wireless communication device that is capable of performing a variety of functions.

In addition to traditional wireless communication devices, many different types of portable electronic devices are in use today. In particular, notebook computers, palm-top computers, and personal digital assistants (PDA) are commonplace. The use of wireless communication devices is widespread and it is expected that in the near future combined mobile telephone/PDA devices will be widely used by the masses. Currently, most of these devices are only used by a small segment of the population due, in large part, to the fact that there are a limited number of applications and services available for such devices.

The Internet has become a widely used medium for providing business information in a variety of forms that are targeted to various types of individuals and businesses. Generally speaking, one of the problems associated with searching for business information on specific products and services using the Internet is being able to locate relevant business information for products and services that are available in a geographic area that is located near the user. As such, a need exists for a way to provide a broad range of business information and content to wireless communication devices and workstations that are based on the respective geographic location of the communication device at the time the information is requested.

Users of several different types of remote terminals often desire to use directory assistance services that are provided by various telephone companies. Many of these directory assistance calls originate in a respective metropolitan telephone service area and request listing information for listings contained in the same metropolitan service area. Most local directory assistance services in use today are handled by an operator that assists the requestor by manually inputting the requested information into an application that searches a database containing residential and business listings. As such, a need exists for providing an enhanced directory assistance system that is capable of automatically providing geographically targeted responses to requestors.

SUMMARY OF THE PRESENT INVENTION

A preferred embodiment of the present invention discloses a method of providing location-based services in a communication system that includes a plurality of remote terminals. Although preferentially the remote terminals comprise a wireless communication device, another aspect of the present invention is directed toward providing location-based services to users of various types of computer workstations with Internet access. In the preferred embodiment, a tailored request for information is generated using the remote terminal. The nature of the tailored request for information will depend on the specific type of information that the user of the remote terminal is looking for.

As set forth briefly above, the tailored request for information is a request for information that is generated by a user of the remote terminal. The tailored request for information can be a directory assistance request, which includes the name of a person or business for which the user is searching. In addition, the tailored request for information can be in the form of a request for information concerning a specific product or service. For example, a user of the remote terminal may generate a tailored request for information that comprises a request for information about specials that may be offered on televisions or various other types of products from local retailers.

In addition to the tailored request for information, a geographic indicator is also generated that is associated with the remote terminal and is preferentially based on the present geographic location of the remote terminal. As set forth in detail below, the tailored request for information and the geographic indicator are used by the location-based services system to generate structured responses to the tailored request for information that are based on the geographic location in which the remote terminal is located.

In the preferred embodiment of the present invention, after the tailored request for information and the geographic indicator are generated, both are transmitted to a location-based application server. The location-based application server is programmed with an application that generates a structured response to the tailored request for information. The structured response is generated based on the geographic indicator of the remote terminal and the particular type of information that has been requested by the user of the remote terminal. Once the location-based application server generates the structured response, it is transmitted to the remote terminal for use by a respective user of the remote terminal.

In one particular embodiment of the present invention, the tailored request for information is in the form of a voice signal that is provided by a user of the remote terminal. The tailored request for information may also be transmitted to the location-based application server from the remote terminal in the form of a text-based message using a wireless application protocol in other preferred embodiments. Further, the tailored request for information can also be transmitted to the location-based application server from a remote terminal using a web-based protocol in yet another preferred embodiment of the present invention. As such, the location-based services system provides users with a variety of ways to access the services provided by the system, which provides further benefits to users of the location-based services system by providing ease of access.

As set forth above, the geographic indicator that is generated and used by the location-based services system is based on a respective geographic location of the remote terminal. In other preferred embodiments of the present invention, the geographic indicator can be defined by a user of the remote terminal. The geographic indicator may be generated by the remote terminal or a base station of the preferred wireless communication system. The present invention may also advantageously take advantage of an enhanced 911 system that is used to determine the geographic location of remote terminals in other preferred embodiments.

As set forth above, in response to the tailored request for information that is generated using the remote terminal, the location-based application server generates a structured response that contains data that is responsive to the tailored request for information. The structured response may be generated in the form of a voice signal or a text/graphic based structured response that is generated using a wireless application protocol or a web-based protocol. Regardless of the format of the structured response, the location-based application server transmits the structured response to the remote terminal in a format that a user can readily access and interact with using the remote terminal.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
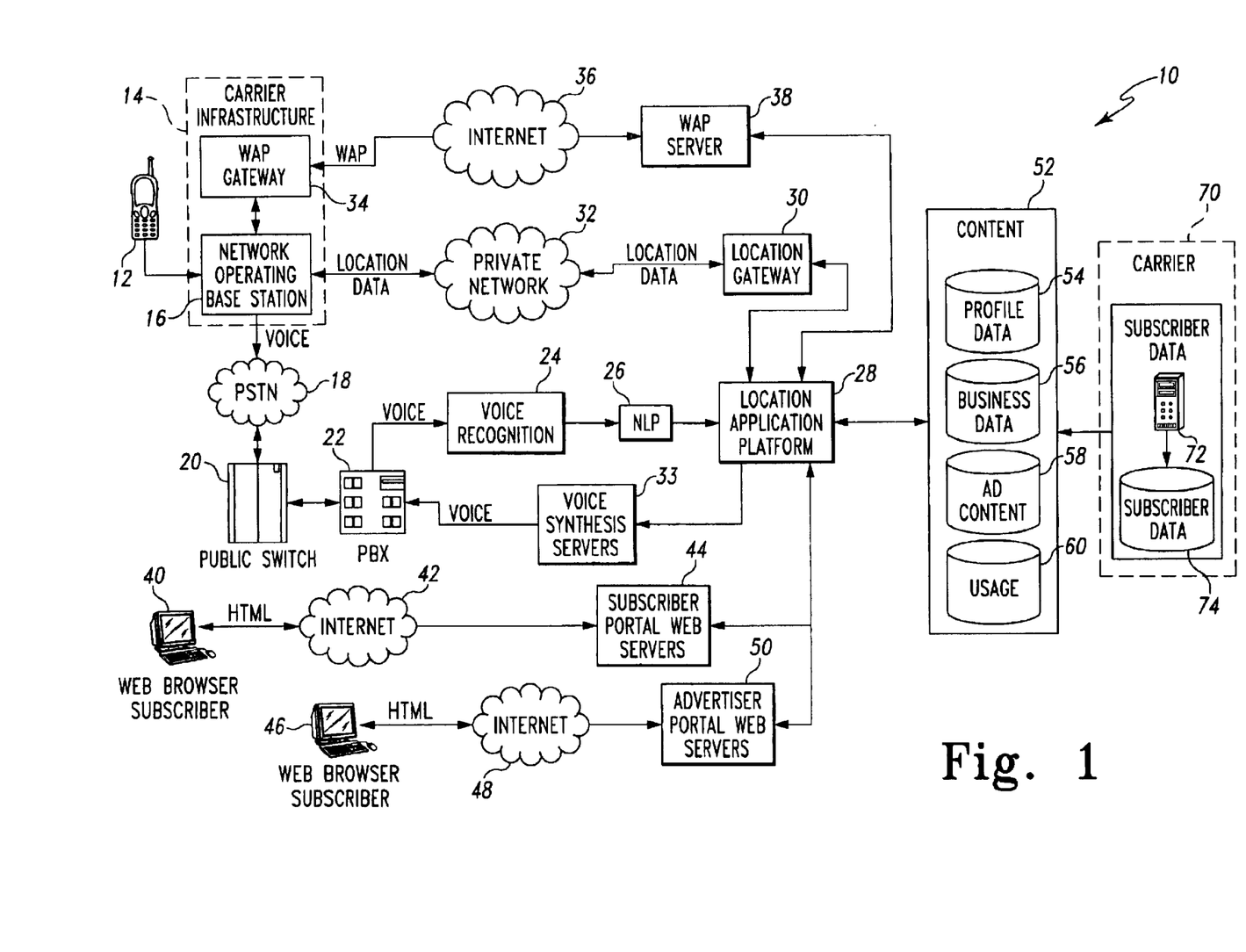
FIG. 1 illustrates a preferred embodiment of the location-based services system.

The present invention discloses a method and system for delivering location-based services through a variety of communication networks. Referring to FIG. 1, the preferred location-based services system 10 uses the geographic location of a remote terminal 12 to provide geographically targeted services to the remote terminal 12. Remote terminals 12 that subscribe to the location-based services system 10 are capable of selecting and receiving information from a broad range of business and service providers that are located in a geographic region that is close to the remote terminal 12 and, thus, the user.

As illustrated in FIG. 1, one preferred embodiment of the location-based services system 10 includes a remote terminal 12 that is connected to a wireless communication system 14 using one of several available and commonly used communication protocols. As illustrated, the remote terminal 12 is connected to a base station 16 of the wireless communication system 14, which transmits and receives radio signals to the remote terminal 12 during operation. Those skilled in the art would recognize that although only one base station 16 is illustrated in FIG. 1, several base stations 16 are actually used to make-up the preferred wireless communication system 14. Ideally, the preferred wireless communication system 14 would cover a wide geographic region, such as, by way of example only, the entire United States.

In the preferred embodiment of the present invention, the remote terminal 12 is capable of sending a digital input signal to the base station 16. The term digital input signal should be broadly construed to include voice signals, keypad input data, and pointer device selections or data from any other commonly used means for inputting data into a respective remote terminal 12. Those skilled in the art would recognize that several peripheral devices are available for various types of remote terminals 12 that could be used to input data into the remote terminals 12 and may be taken advantage of by the present invention.

Preferentially, the wireless communication system 14 is a digital communication system that uses one of several different methods of providing wireless digital communication between the remote terminals 12 and the base stations 16. The wireless communication system 14 can use frequency division duplexing (FDD) or time division duplexing (TDD) to allocate for the two directions of transmission between the remote terminal 12 and the base station 16.

In order to provide multiple access methods to the remote terminals 12, which refers to the method of creating multiple channels for each transmission direction, one of several different types of multiple access methods may be used in the present invention. Three preferred types of multiple access methods that might be used include: frequency division multiple access (FDMA); time division multiple access (TDMA); and/or code division multiple access (CDMA). Those skilled in the art would recognize that the present invention could readily be adapted to take advantage of other multiple access methods as well.

As further illustrated in FIG. 1, in the preferred embodiment of the present invention the base station 16 of the wireless communication system 14 is connected to a public switched telephone network (PSTN) 18 by a public switch 20. As known to those skilled in the art, the PSTN 18 is a worldwide voice telephone network that is used to allow various communication devices to communicate with each other. Although the preferred PSTN 18 is a digital system, the present invention may be adapted for use on analog systems as well to accommodate geographic regions that might be underdeveloped or not serviced by a digital system.

The public switch 20 transfers the signals that are received from the base station 16 to a private branch exchange (PBX) 22. The public switch 20 is connected to the private branch exchange (PBX) 22, which, as generally known in the art, is a telephone switching system that is used to interconnect various telephone extensions to each other. In the preferred embodiment of the present invention, the PBX 22 uses all-digital methods for switching and is capable of supporting digital remote terminals and telephones and analog remote terminals and telephones. As set forth in greater detail below, in the preferred embodiment, the PBX 22 is connected to a server of the location-based services system 10, which is a form of a digital remote terminal.

Referring to FIG. 1, in this embodiment of the present invention, the PBX 22 is connected to at least one voice recognition server 24. The voice recognition server 24 contains at least one voice recognition application that is operable to recognize the respective words that are contained in the voice signals that are received from the PBX 22. As set forth in greater detail below, a resulting output is generated by the voice recognition application that is used by a natural language processing application.

The voice recognition server 24 is connected to at least one natural language processing server 26 that includes at least one natural language processing application that processes the identified words contained in the voice signals to ascertain the meaning of the words that are contained in the voice signals. As such, during operation, the voice recognition server 24 identifies or recognizes the particular words that are contained in the voice signals and the natural language processing server 26 interprets the meaning of the recognized words of the voice signals that are originally generated from the remote terminal 12. The natural language processing application may be located on the voice recognition server 24 in other embodiments of the present invention, but, in an effort to increase the level of performance, would preferentially be located on a separate server or a separate set of servers.

The natural language processing server 26 is connected to at least one location-based application server 28. As set forth in detail below, the location-based application server 28 is programmed to provide responsive information to the remote terminals 12 that has been requested by a respective user of the remote terminal 12. Generally speaking, the location-based application server 28 is used to retrieve and pass on location-based information to the remote terminals 12 in various data formats. The type of information provided to the remote terminals 12 varies depending on the specific nature of the information that has been requested from the user and the geographic location of the remote terminal 12.

During operation, after the meaning of the words in the voice signals are interpreted, the natural language processing server 26 is programmed to create a structured request that is sent to the location-based application server 28. In response to the structured request, the location-based application server 28 generates a structured response that is sent to the remote terminal 12. As set forth in greater detail below, the exact nature of the information sent in the structured response depends on the specific request that is made by a particular user of the remote terminal 12.

If an analog voice signal is used, although not illustrated in FIG. 1, at least one digital signal processor server could be used to convert the analog signal into a digital signal that the voice recognition server 24 can process and interpret using the voice recognition applications. In this respective embodiment, the digital signal processor server is preferentially connected between the voice recognition server 24 and the PBX 22. Those skilled in the art would recognize that the voice recognition server 24 might also be designed to perform the functions of the digital signal processor server in other embodiments of the present invention.

Each remote terminal 12 also sends a unique remote terminal identifier to the base station 16 while communicating with the base station 16 of the wireless communication system 14. The remote terminal identifier is preferentially attached to each voice signal as it passes through the location-based services system 10 so that the system can keep track of which respective remote terminal 12 is supposed to receive the information that has been requested. Those skilled in the art would recognize that various identification methods might be used to keep track of specific remote terminals 12 using the location-based services system 10.

As further illustrated in FIG. 1, the location-based application server 28 is also connected to a location gateway server 30, which is, in turn, connected to the base station 16 of the wireless communication system 14. The location gateway server 30 is used by the location-based application server 28 to retrieve a geographic indicator that is associated with each respective remote terminal 12. As such, while a respective remote terminal 12 is connected to the wireless communication system 14, the location-based application server 28 is capable of determining the respective geographic location of the remote terminal 12 so that geographically targeted responses and information can be provided to the remote terminal 12.

As illustrated in FIG. 1, the location gateway server 30 is preferentially connected to the base station 16 of the wireless communication system 14 using a network connection 32, which may be a private network connection or an Internet connection in alternative embodiments of the present invention. The geographic indicator may be generated by the remote terminal 12 or the base station 16 and is preferentially transmitted to the location-based application server 28 when a user of the remote terminal 12 is accessing the location-based services system 10. The geographic indicator is preferentially transmitted to the location-based application server 28 with the remote terminal identifier so that the location-based application server 28 can associate each respective remote terminal 12 with a particular geographic location.

In the preferred embodiment of the present invention, the geographic indicator may be preset by a user of the remote terminal 12, automatically generated by a GPS located in the remote terminal 12 or generated by a specialized geographic determination application running on the base station 16. In addition, the present invention may advantageously take advantage of an enhanced 911 system of the wireless communication system 14 to generate the geographic indicator. In another embodiment of this invention, the geographic indicator may originate from a combination of these sources and/or systems (i.e. it could come from a GPS-assisted network that uses GPS and devices on the network). The geographic indicator may automatically be sent to the location-based application server 28 as soon as a respective remote terminal 12 connects to the wireless communication system 14; however, in alternative embodiments of the present invention, the geographic indicator is only sent when a respective remote terminal is sending a structured request to the location-based application server 28. As the geographic location of the remote terminal 12 changes, the geographic indicator is updated and the updated information can continuously be sent to the location-based application server 28.

As further illustrated in FIG. 1, at least one voice synthesis server 33 is connected to the location-based application server 28 and the PBX 22. For voice-related applications of the location-based services system 10, the voice synthesis server 33 is used to generate voice responses that are based on the structured responses that are generated in response to the structure requests that are received by the location-based application server 28. Voice synthesis applications on the voice synthesis server 33 are used to transform the structured responses into voice response. In the preferred embodiment, the PBX 22 is used to transmit the voice responses to the PSTN 18, which, in turn, transmits the voice response to the base station 16, which ultimately transmits the voice response on to the remote terminal 12. In alternative embodiments of the present invention, the voice synthesis server 33 may be connected directly to respective base stations 16 of the wireless communication system 14.

Referring once again to FIG. 1, in yet another preferred embodiment of the present invention, the remote terminal 12 is connected to the location-based application server 28 through a wireless application protocol (WAP) gateway 34 of the wireless communication system 14. The WAP gateway 34 is connected to a WAP server 38 of the location-based services system 10 through a network connection 36. The network connection 36 may be a private network connection or an Internet connection. The WAP server 38 is connected to the location-based application server 28 and, during operation, is used to generate structured requests, which are based on requests that are input to the remote terminal 12 and sent to the location-based application server 28.

The remote terminal 12 is capable of communicating with the WAP server 38 and the location-based application server 28 using a WAP standard. As known to those skilled in the art, the WAP standard is a protocol that is designed for wireless communication devices to provide secure access to e-mail and text-based web pages. WAP provides a complete environment for wireless applications that includes a wireless counterpart of TCP/IP and a framework for telephony integration. In the preferred embodiment of the location-based services system 10, the remote terminals 12 may also be capable of browsing for location-based services through the use of text and graphical based menus that can be provided to the remote terminals 12 from the location-based application server 28.

One preferred embodiment of the present invention uses the WAP standard to support the use of a Wireless Markup Language (WML), which is a streamlined version of HTML for small screen displays, to conduct communication and transfer information between the remote terminal 12 and the location-based application server 28. WAP is also capable of using WMLScript, which is a compact JavaScript-like language that is capable of running in limited memory on the remote terminal 12. The location-based services system 10 can also be designed to advantageously take advantage of this capability to provide location-based services to users of remote terminals 12 depending the particular geographic location of the remote terminal 12.

In this preferred embodiment of the present invention, the WAP standard supports various handheld input methods such as keypad inputs or pointer device inputs that may be generated on various different types of remote terminals 12. As it relates to the present invention, this gives users of the remote terminals 12 the capability of inputting data from keypads for the purposes of entering search requests to the location-based services system 10. In addition, the remote terminals 12 are capable of receiving, interpreting and displaying web pages that include hypertext links to other web pages that may be selected using various selection methods.

For the purpose of the present invention, the term wireless application protocol should be broadly construed to include any communication protocol similar to what is commonly referred to as the "WAP standard," which, as set forth above, is used to transmit text and graphics-based information to remote terminals 12. Although the WAP standard is used in this particular preferred embodiment of the present invention, those skilled in the art should recognize that other text and graphics-based communication protocols could be used in alternative embodiments of the present invention.

For example, although not specifically illustrated, another preferred embodiment of the present invention could be designed for an i-Mode wireless communication system. i-Mode wireless communication systems use a packet-based communication protocol to communicate between the remote terminals 12 and the base station 16, which essentially means that the remote terminals 12 are connected to the wireless communication system at all times and communicate with the base stations 16 using packets. i-Mode is also capable of providing web-browsing and customized applications to remote terminals 12.

i-Mode is a proprietary system that uses a subset of HTML, known as cHTML, in contrast to the WAP standard, which uses WML. In this particular embodiment, an i-Mode server is used to connect the base station 16 of the wireless communication system 14 to the location-based application server 28. The remaining details of this particular embodiment are similar to other embodiments of the present invention and, as such, a more detailed discussion is not necessary.

Referring to FIG. 1, in yet another preferred embodiment of the location-based services system 10, a second remote terminal 40 is connected to a subscriber portal web server 44 through a network connection 42. The network connection 42 may be a private network connection or an Internet connection. As illustrated, the subscriber portal web server 44 is also connected to the location-based application server 28. During operation, the second remote terminal 40 is programmed to receive structured requests that are sent to the location-based application server 28 and, likewise, the location-based application server 28 is programmed to generate structured responses that are sent to the second remote terminal 40.

The second remote terminal 40 and the location-based application server 28 preferentially communicate with each other using standard web-based protocols that are commonly used in various Internet-based applications. In this embodiment of the present invention, a user accesses the subscriber portal web server 44 through the second remote terminal 40, which is preferentially a computer workstation. As a subscriber to the location-based services system 10, the second remote terminal 40 is assigned a predetermined geographic indicator. The geographic indicator is used by the location-based application server 28 to target services and business content to the second remote terminal 40 that are based on the geographic location of the second remote terminal 40.

The user of the second remote terminal 40 may be given the option of setting the geographic indicator to a desired geographic location, which may or may not be the exact geographic location of the second remote terminal 40. For example, if the user is traveling to another city that evening and wants to access location-based services in that particular city, an option can be provided allowing the second remote terminal 40 to designate that particular city.

In this preferred embodiment of the present invention, the second remote terminal 40 is preferentially a computer workstation that includes multimedia capabilities and includes a microphone and a sound card. As known to those skilled in the art, this allows the second remote terminal 40 to generate sound through a speaker system and receive voice signals through the microphone. Although not specifically illustrated in FIG. 1, this could allow the subscriber portal web server 44 to be connected to the voice recognition server 24 so that voice signals sent from the second remote terminal 40 could be processed similar to the method used to process voice signals received from wireless remote terminal 12.

Referring to FIG. 1, a business remote terminal 46 is connected to a network connection 48 that is connected to an advertiser portal web server 50. The network connection 48 may be a private network connection or an Internet connection. The advertiser portal web server 50 allows various businesses (i.e., content providers) to add, modify and/or delete campaigns that are designed to promote and sell various products and services through the location-based services system 10. For example, if a particular business entity desires to run a promotion on a particular product or service, the advertiser portal web server 50 allows the business entity to modify their respective listings to include the respective items or services on special.

As further illustrated in FIG. 1, the preferred location-based services system 10 is also capable of leveraging data that is preferentially grouped in four logical data groupings 52. These logical data groupings include profile data files 54, business data files 56, additional data files 58 and usage data files 60. The data files 54–60 contain detailed information on various items and services that are used by the location-based services system 10, which is set forth in detail below. The data files 54–60 can be located on the location-based application server 28, but are preferentially maintained on separate servers.

The profile data files 54 contain a group of logical entities that contain relevant information concerning each consumer of the location-based services system 10. These logical entities include, but are not specifically limited to the following items: consumer name; consumer phone number; consumer identification; consumer password; consumer home address; consumer home phone number; consumer email address; consumer pager number; consumer service subscriptions (detailing the consumers chosen level of participation in one or more services); consumer privacy preferences (detailing information denoting the willingness to share a consumers private data with others based on data type, requester, service, etc.); consumer service preferences (detailing any specific saved information that is relevant to any of the services which a consumer may use, such as: named locations (such as the address for a consumers work location, or the address(es) of a consumers friend(s); named interests or preferences regarding hobbies, news topic interest, sports, music, preferred brands or chains, banking information and other demographic information. (such as NBA basketball, Jazz music, Italian food, favorite clothing brands or chains, banking information, etc.)); and preferred asynchronous communication method (such as email or pager) listed by service and/or service/content provider.

The business data files 56 are composed of a group of logical entities containing all relevant information regarding the businesses listed within the location-based services system 10, including but not limited to: business name; business phone number; business text description; business audio description; business video description; business and/or product images; business identification; business password; business category or categories; advertising participation level; advertising campaign information such as: parameters that define target market; campaign identification code; advertising content and special deals/discounts; saved data mining/reporting parameters; brands sold; brands serviced; product types sold; product types serviced; product models sold; product models serviced; product model prices; and service prices and inventory list (by brand, product type and product model).

The additional data files 58 contains a group of logical entities that generally includes any additional content that is capable of being leveraged by the location-based services system 10, possibly including, but not limited to: business ratings (via external evaluation services); weather conditions; driving directions; maps; traffic Although not specifically illustrated, the residential telephone number and address listings may be provided by local telephone companies through a residential listing server that is connected to the location-based application server 28.

The usage data files 60 contains a group of logical entities that generally includes all recorded information regarding consumer transactions from remote terminals 12, 40, possibly including, but not limited to: consumer identification (or a unique hash of consumer identification); date; time; service used; request type; search criteria; matched data purchases made, and actions taken. Those skilled in the art would recognize that several other types of usage data might be stored in the usage data files 60.

As generally set forth above, users of the location-based services system 10 are given the ability to search, via a remote terminal 12, 40, for a business that will satisfy specific purchase or service requirements using multiple access methods (voice, wireless application protocol or web application protocol). The location-based application server 28 is programmed to handle a variety of structured requests and is capable of generating a variety of structured responses in the same format (i.e.—voice, wireless application protocol or web application protocol) that the structured request was received by the location-based application server 28.

Some of the structured request parameters that are capable of being used for the business services provided by the location-based services system 10 include (but are not necessarily limited to) one or more of the following: product type; service type; business name; business category; product name (or model name); product brand; price level; business or service ratings (i.e. external evaluation from a rating service such as AAA); whether special deals are provided; location (auto-location (locating nearest ATM for instance), predefined locations, or consumer-specified locations); hours of operation; availability of service (for example: availability of a open table at a specified time at a restaurant); and company specified within favorites for a category (i.e., name of favorite coffee house franchise). Those skilled in the art would recognize that a variety of structured request parameters might be used in the present invention.

Optionally, consumers have the ability to "opt-in" to "push" content and advertising services. Push services are defined as services, which proactively deliver content to the consumer through the remote terminal 12, 40, rather than services delivered only following a request by the consumer. As set forth above, the preferences of the consumers that use the remote terminals 12 are stored within the profile data files 54. As such, by way of example only, a consumer that likes golf may be "pushed" an offering as they travel close to a nearby golf equipment store relating to a special offer on an item such as a golf club or particular brand of golf ball.

As set forth briefly above, the location-based services system 10 also gives businesses the ability to manage their respective content and mine usage data by using the advertiser portal web server 50. The advertiser portal web server 50 preferentially includes the following web-based applications: a campaign management application, a business profile management application, a mining/reporting and predictive modeling application. Each of these applications and their respective functional aspects is discussed in greater detail below.

The campaign management application includes several applications that allow a business to create advertising campaigns and an edit/delete advertising campaigns. The create campaign capability enables an advertiser to create a location-based advertising campaign. As part of this capability, the business would define the market segment at which the advertising is targeted. Then, the advertiser would define the advertising content that would be delivered to the target market, as well as the mechanism of delivery (i.e. pushed to each consumers remote terminal 12, 40, or presented only to a consumer when they make a relevant enhanced directory assistance request/search). The edit/delete campaign capability allows the business to modify or delete an existing campaign that has already been created and is running on the location-based application server 28.

The business profile management application includes a create business listing capability and an edit business listing capability. The create business listing capability enables a business to define their respective set of business data (see above for a list of content within the business data). The edit business listing capability allows the business to modify or delete their business listing. Those skilled in the art would recognize that several other options might be made available through the business profile management application.

The mining/reporting capability allows business to interface with data that is stored in the usage data files 60. An advertising effectiveness interface utilizes the usage data files 60 and business data files 56 to generate analysis surrounding the effectiveness of location-based advertising campaigns. The analysis will address questions such as "How many people received my campaign in the downtown area of Atlanta". The information provided to the businesses provides them insight to quantify the results of campaigns created in the location-based services system 10 through the campaign management tool.

The predictive modeling capability provides forecasting for potential customers likely to respond to offers, listings and deals. Examples of the type of feedback the consumer will receive include (but not limited to) the following: identifying customers likely to respond to their campaign by customer segment; identifying customers likely to request a campaign or listing by customer segment; and identifying demands by peak time or day.

As briefly set forth above, the location-based services system 10 provides a consumer using a remote terminal 12, 40 with access to products and services in a designated geographic area through multiple access methods such as voice, wireless application protocols (such as WAP and cHTML) and web protocols (such as Java and HTML). The present invention encompasses the full lifecycle of the location-based services system 10 including delivery and maintenance, which includes content management, consumer management, content delivery, advertising management, advertising reporting, advertising delivery, usage tracking, usage mining and reporting, billing and settlements.

The preferred location-based services system 10 is capable of providing location-based services to consumers through remote terminals 12, 40 and is managed by various content providers through the use of respective business remote terminals 46. The services that are provided through the location-based services system 10 preferentially includes an enhanced directory assistance service and an enhanced business service that is delivered through a voice recognition capability, wireless application protocol capability and/or web application capability.

In order to access the enhanced directory assistance services or the business services, the user of the remote terminal 12 preferentially enters a predetermined key sequence (e.g.—by pressing 411) on the keypad of the remote terminal 12 or by pressing a specially designed key on the remote terminal 12. If the remote terminal is not connected to the base station 16 already, when the enhanced directory assistance services or business services are selected, the remote terminal 12 establishes a connection with the base station 16 of the wireless communication system 14, which acts as a gateway to the location-based services system 10.

In another embodiment, in order to select one of the respective services, the user of the remote terminal 12 is given the option of using voice commands, but as previously set forth may also use keypad inputs on the remote terminal 12 to select the desired services as well. Those skilled in the art should recognize that the enhanced directory assistance services and the business services do not necessarily have to be provided through the same access method and that a keypad-based menu system may be used until the appropriate time occurs for the user to input a voice signal containing a request for information.

By way of example only, if the enhanced directory assistance services are selected by a user of the remote terminal 12, either the base station 16, the location-based application server 28 or remote terminal 12 can be programmed to generate a search parameter request that is audibly generated on the remote terminal 12. In the embodiment being discussed, the search parameter request is sent in the form of a voice signal that prompts the user to state the first and last name of the person they are looking for. In addition, the search parameter request could also include an option that might prompt to user to also state the geographic area where the person is located. As should be apparent from the discussion above, since the location-based services system 10 includes voice recognition applications, those skilled in the art should recognize that the entire process of entering the search parameter request may be done by voice signals generated on the remote terminals 12.

In response to the search parameter request that is generated on the remote terminal 12, the user preferentially provides a vocal response to the remote terminal that is transmitted to the base station 16. The vocal response preferentially includes a first name response and a last name response (and possibly a detailed geographic information response for non-local listings) of the particular person the user is looking to retrieve information on. The vocal response to the search parameter request, which preferentially also includes a unique remote terminal identifier that is associated with each respective remote terminal 12, is then sent from the remote terminal 12 to the base station 16. The base station 16 transmits the voice response to the PSTN 18, which then routes the vocal response, together with the remote terminal identifier, to the PBX 22.

The PBX 22 transmits the vocal response and the remote terminal identifier as inputs to voice recognition applications and natural language processing applications that are located on servers 24, 26, which in turn, respectively transform the vocal response and the remote terminal identifier into a structured residential listing request that is sent to the location-based application server 28. As set forth in detail above, the voice recognition applications analyze the vocal responses for the purposes of making a determination of the identity of particular words contained in the vocal responses. Any detailed geographic information provided by the user is also added to the structured residential listing request that is sent to the location-based application server 28.

Figure 2:
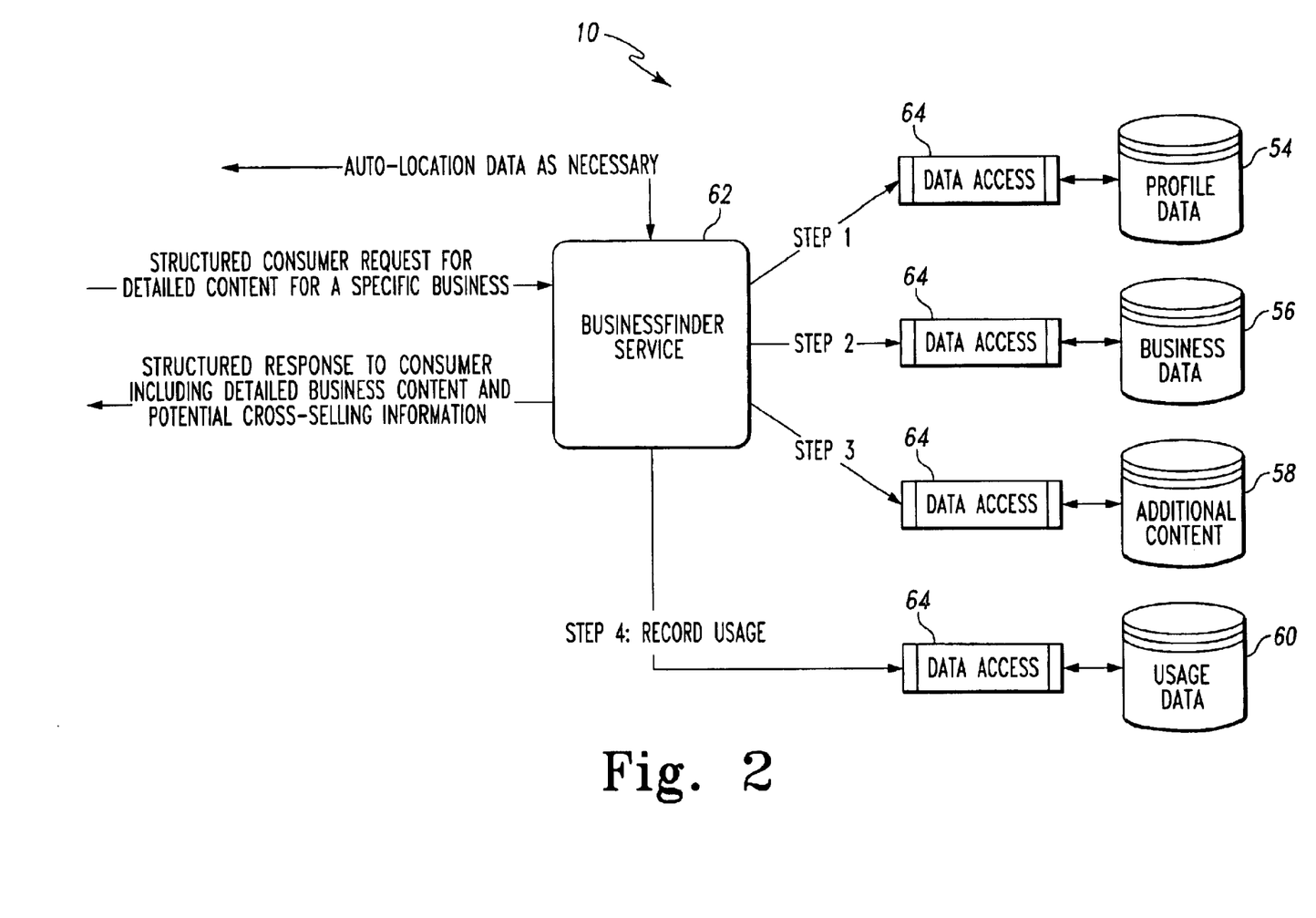
FIG. 2 is a flow chart illustrating the process steps performed by the location-based application server when processing structured requests.

As illustrated in FIG. 2, the structured residential listing request is used as an input to a residential finder application 62 located on the location-based application server 28. During operation, the residential finder application 62 interprets the structured residential listing request and uses at least one data access routine 64 to locate and retrieve the specific information requested by the structure residential listing request from a respective database file 54–58. Those skilled in the art should recognize that several database servers may be connected to the location-based application server 28 that are used to store various forms of information and content that is provided to users by the location-based services system 10 in varying types of formats, which will be set forth in greater detail below.

In the preferred embodiment of the present invention, the residential finder application 62 matches up the structured residential listing request with the geographic indicator of the remote terminal 12. If no geographic information is contained in the structured response, the residential finder application 62 conducts a search of the profile data files 54 and the additional data files 58 with data access routines 64 targeted within a predetermined area based on the geographic location of remote terminal 12. If geographic information is included in the vocal response, the residential finder application 62 conducts a search within the geographic area specified by the user. As set forth above, in the preferred embodiment of the present invention the residential listing database files are stored under the additional data files 58 by way of example only and should not be construed as a limitation of the present invention.

The residential finder application 62 preferentially also searches the profile data files 54 so that if the identity of the person contained in the structured residential request is identified as a subscriber of the location-based services system 10, a remote terminal 12 telephone number and/or an email address may also be added to the response that is provided to the user requesting the desired information. If the located person does turn out to be a subscriber of the location-based services system 10, other embodiments of the present invention allow the subscriber to create a personalized response that is stored in a database file and is provided in response to residential listing requests that identify them.

In addition to receiving the structured residential listing requests, the residential finder application 62 obtains a geographic indicator and a remote terminal identifier associated with the remote terminal 12. This allows the system to default to the geographic location of the remote terminal 12 to conduct the search, as set forth above. For instance, if the remote terminal 12 is located in Atlanta, Ga., the residential finder application 62 will know this from the geographic indicator and will only search listings in the Atlanta area.

Once the appropriate data is located by the residential finder application 62 that is responsive to the structured residential listing request, which in the present example would preferentially include at least one telephone number and/or the address of the person(s) named in the voice signal, the residential finder application 62 is operable to generate a structured residential response that is sent to voice synthesis server 33. As set forth in detail above, the voice synthesis server 33 is programmed to transform the structured residential response into a voice response signal with voice synthesis applications located on the voice synthesis server 33.

As set forth briefly above, the voice response that are generated by the voice synthesis server 33 can include the name, address, residential telephone number, mobile number and/or email address of the particular person for which the user has requested a residential listing. For those instances where the structured residential responses include more than one residential listing, the residential listing finder application 62 is preferentially programmed to generate a structured residential response that provides the multiple listing results in a predetermined organized listing arrangement.

The predetermined organized listing arrangement is preferentially set up so that the user of the remote terminal 12 is capable of interacting with the listings provided in the voice response through the use of a keypad input or by voice signals that are spoken into the remote terminal 12 by the user. Preferentially, the information is organized and presented to the user of the remote terminal 12 based on the address of the particular people identified by the residential finder application 62, however, those skilled in the art would recognize that other alternatives of presenting and organizing the results exist (i.e.—ranking the results in geographic order) are capable of being used in varying embodiments of the present invention.

If the person for whom information has been requested is designated as being unlisted or unavailable, the location-based application server 28 is preferentially programmed to generate a structured residential response that contains a message that indicates that the requested information is unlisted or unavailable. As such, in this particular embodiment of the present invention the location-based application server 28 sends the structured residential response to the voice synthesis server 33, which generates a voice signal that is sent to the remote terminal 12 informing the user that requested the residential listing that the requested residential listing it unlisted or unavailable.

As briefly set forth above, another preferred embodiment of the location-based services system 10 is capable of providing business services to the remote terminal 12, which are provided to the remote terminal 12 based on the geographic location of the remote terminal 12. If the user of the remote terminal 12 selects the business services option instead of the enhanced directory assistance services option, a variety of information services are capable of being delivered to the user through the location-based services system 10. During operation, the business services are provided to the remote terminal 12 through similar access methods that the residential listing services are provided to the remote terminal 12. In addition to being able to obtain the address and telephone number of local businesses, various other forms of business information is capable of being transmitted to the remote terminal 12 by the location-based services system 10.

As generally set forth above and in greater detail below, some of the preferred structured business request parameters that are capable of being processed by the business services of the location-based services system 10 include (but are not necessarily limited to) one or more of the following parameters: product/service types; business names; business category; product name (or model name); product brands; price level; business or service ratings (e.g.—external evaluation from a rating service such as AAA); whether special deals or offers are being provided; auto-location of predefined services (e.g.—locating the nearest ATM for instance); hours of operation; availability of service (e.g.—availability of a open table at a specified time at a restaurant); and/or business information specified within a user defined favorites category (e.g.—name of favorite coffee house franchise, favorite clothing brands, favorite restaurants).

In this preferred embodiment of the present invention, once a user of the remote terminal 12 gains access to the business services provided by the location-based services system 10, they are prompted by a voice signal requesting the user to state their respective business request. In response to the prompt for a business request, the user states a vocal response that is received by the remote terminal 12 that contains a predetermined request for a predetermined type of business content. The exact nature and content of the vocal response will vary, depending on the specific type of business/service information that is being requested by the user of the remote terminal 12. As set forth above and below, the preferred embodiment of the present invention includes natural language processing applications the are used to interpret the meaning and context of the words contained in the vocal response, thereby allowing the user of the remote terminal 12 to make a request using requests that are spoken using statements commonly used in everyday conversations.

By way of example only, lets say that a respective user of the remote terminal 12 wants to obtain business information related to determining the location of a favorite local fast-food restaurant. As such, the user's vocal response that is received by the remote terminal 12 might contain a voice signal that includes a request for business information that could be phrased something along the lines of the following statement: "What is the address of a Burger King restaurant that is close to my present location?" As previously set forth, this preferred embodiment of the present invention is capable of interpreting this request using natural language processing applications to generate a structured response.

As with the residential services, in this embodiment of the present invention the vocal response that is provided by the user of the remote terminal 12 is transmitted from the remote terminal 12 to the base station 16 of the wireless communication system 14, which in turn is operable to transmit the vocal response to the PSTN 18 that transmits the vocal response to the PBX 22. The vocal response is then sent from the PBX 22 to the voice recognition server 24 where it is processed with voice recognition applications to determine the identity or recognize the respective words that are contained in the vocal response from the user containing a business information request. Although not illustrated, in an alternative embodiment of the present invention the base station 16 is directly connected to the voice recognition server 24, thereby allowing the base station 16 to directly transmit vocal response to the voice recognition server 24.

After the words contained in the vocal response have been recognized using voice recognition applications, a respective output is generated by the voice recognition applications, which is used as an input to natural language processing applications. As set forth in detail above, the natural language processing applications determine the meaning and context of the words contained in the vocal response that is received by the remote terminal 12. Referring once again to FIG. 2, once the meaning and context of the recognized words contained in the vocal response have been determined, the natural language application is programmed to generate a structured business request that is sent to the location-based application server 28. The location-based application server 28 includes at least one business/services finder application 62 that is operable to process the structured business request by retrieving the requested information.

As set forth in detail above, the remote terminal 12 also sends a remote terminal identifier with the vocal response that is preferentially integrated in some manner with the structured business request that is ultimately generated and sent to the location-based application server 28. In addition, in this preferred embodiment of the present invention as well as others, a geographic indicator and a remote terminal identifier associated with the respective remote terminal 12 making the structured business request is also obtained or has already been obtained by the location-based application server 28. As illustrated in FIG. 2, the geographic indicator and the structured business request are used by the business/services finder application 62 to generate a structured business response that is responsive to the structured business request.

In our current example, the preferred business/services finder application 62 uses the geographic indicator of the remote terminal 12 to determine which particular Burger King location is closest to remote terminal 12. A mapping routine within the business/services finder application 62 compares the geographic location of the remote terminal 12 with the respective geographic locations of Burger King restaurants retrieved by the structured business request and makes the determination of which location is closest to the remote terminal 12, which can be based on the distance of the remote terminal 12 from each respective location. As illustrated in FIG. 2, this is accomplished by a data access routine 64 that accesses the appropriate information from the business data files 56, which preferentially contains a database of business listings, addresses, products and/or services provided.

After the appropriate information is located, the location-based application server 28 is programmed to generate a structured business response that is sent to the voice synthesis server 33. The voice synthesis server 33 converts the structured business response into a voice signal that is then sent to remote terminal 12. In this example, the structured business response would contain the address of the Burger King that is closest to remote terminal 12, which has been determined by the location-based application server 28 based on the geographic location of remote terminal 12.

In yet another example of this embodiment of the present invention, a user of the business services might request information on a retail store that sells a specific product or provides a specific service. For instance, a user might state: "Who sells or provides product/service (stating the particular product/service desired)?" After the voice recognition application and the natural language processing application interpret and transform the request into a structured business request, the business/services finder application 62 uses the geographic indicator of remote terminal 12 to narrow the structured business request to retrieve business information contained within a predefined geographic area in which the remote terminal 12 is located. If more than one business sells the item or provides the requested service, the business/services finder application 62 is programmed to generate a structured business response that is sent to voice synthesis server 33 containing a listing of the respective businesses meeting the desired criteria.

In yet another preferred embodiment of the present invention, the user is able to access the location-based services system 10 by using a wireless application protocol to generate and transmit structured requests to the location-based application server 28. A user of remote terminal 12 uses a keypad or some other equivalent input means to access the location-based services system 10 from a selection menu that is generated on a display of remote terminal 12. In this preferred embodiment of the present invention, once a user chooses to obtain access to the location-based services system 10, the remote terminal 12 is preferentially programmed to display a selection menu that contains a link to the business services and residential listing services provided by the location-based services system 10. Those skilled in the art would recognize that various predefined links and menu selections for various types of services may also be displayed that may or may not be specified by the user of remote terminal 12.

If the residential listing service is selected on the remote terminal 12, the user is prompted by remote terminal 12 to enter the first and last name of the person for which they desire to obtain information. By default, the remote terminal 12 is preferentially programmed to search for a listing that is contained in the immediate geographic location of the remote terminal 12. For example, if remote terminal 12 is located in the Atlanta metropolitan area, the search will be preset to be conducted using the Atlanta residential listings database. In alternative embodiments of the present invention, an additional input area is provided on the display of the remote terminal 12 whereby the user may designate the particular geographic location to search (i.e.—a city and state input location). As apparent, this allows the user to vary the location searched based on user preferences thereby providing further benefits to the user.

An additional item the remote terminal 12 is programmed to generate on the display is an icon or a selection area that is designated to cause the remote terminal 12 to transmit the search request, which contain the parameters that have been input by the user, to the base station 16 of the wireless communication system 14. As previously set forth, preferentially the search request is sent to the base station 16 using a wireless application protocol, which for the purpose of the present invention should be broadly construed to include a broad range of standards used by various wireless communication systems 14. The remote terminal 12 also transmits a remote terminal identifier with the search request, which as previously set forth, is assigned to remote terminals 12 for identification purposes. Once received by the base station 16, the search request is directed to the WAP gateway 34, which in turn, is preferentially programmed to transmit all search requests that are received by users accessing the location-based services system 10 to the WAP server 38.

The WAP server 38 is programmed to interpret the search request and generate a structured residential request that is sent to the location-based application server 28. For identification purposes, the remote terminal identifier is also transmitted to the location-based application server 28 with the structured residential request. As with other embodiments of the present invention, the location-based application server 28 is programmed with a residential finder application 62 that uses one of several data access routines 64 to obtain the requested information from a respective database file 54–58. A structured response is then sent to the WAP server 38, which in turn transmits the structured response to the WAP gateway 34 and ultimately on to the remote terminal 12.

If the business services option is selected, the remote terminal 12 prompts the user for a search request, which the user enters on the remote terminal 12. The search request is then sent to the location-based application server 28, in a similar fashion as described with the directory assistance services, where it is processed by a business/services finder application 62. The business/services finder application 62 uses data access routines 64 to retrieve the desired information and generates a structured response that is based on the geographic location of the remote terminal 12.

For example, if the remote terminal 12 is located on the upper north side of Atlanta, Ga., the location-based application server 28 will be informed of this fact by receiving a geographic indicator from the second remote terminal 12 and will be operable to generate structured responses to structured requests that contain information that is targeted for that particular geographic location. For instance, if a user of the remote terminal 12 enters a search request for information on "Chinese restaurants running specials", a structured response is generated by the business/services finder application 62 that provides information about Chinese restaurants on the upper north side of Atlanta, and not Chinese restaurants located in irrelevant geographic locations, such as the far south side of Atlanta.

As previously set forth, in yet another preferred embodiment of the location-based services system 10 a user of the second remote terminal 40 is connected to a subscriber web portal server 44. The second remote terminal 40 and the subscriber web portal server 44 are designed to communicate with each other using standard web-based protocols (e.g.—HTML). The subscriber web portal server 44 is connected to the location-based application server 28, thereby providing the second remote terminal 40 with access to the business services and enhanced directory assistance services that are offered in the preferred embodiments of the present invention.

The second remote terminal 40 is capable of providing voice or keypad input data to the subscriber web portal server 44. As previously set forth, for voice signals the respective vocal responses are sent to the voice recognition servers 24 for processing and, in the case of keypad input data, the subscriber portal web server 44 is operable to generate structured requests in response to user requests received from the second remote terminal 40 in similar manners as set forth above. The preferred location-based services system 10 is capable of allowing its subscribers to take advantage of the services provided by the present invention in a non-wireless environment as well, by supporting the use of standard computing devices that are typically used at home or work.

As such, by way of example only, lets say a user of the second remote terminal 40 is located in Atlanta, Ga., and wants to find local deals on Polo merchandise as well as stores that carry this particular brand that are located near their respective geographic location. In the case of a keypad input search, the user would be prompted for a search request from a web page generated on the second remote terminal 40 where they would enter their desired search parameters, which in the present example might be in the form of the words "POLO MERCHANDISE".

After the search request is entered and the user is ready to send the request, there is also preferentially an icon or some other type of selection indicator that is generated on a web page being displayed on the second remote terminal 40 that allows the user to submit the request. Once this is selected, the search request, a second remote terminal identifier and a geographic indicator are sent to the subscriber web portal server 44. The subscriber web portal server 44 then transforms the search request into a structured search request that is sent to the location-based application server 28, which processes the structured request similar to other embodiments of the present invention.

In the case of a voice signal input being used, the user would be prompted to state their respective request much like in the example set forth above with relation to wireless remote terminal 12. As such, in the case of our present example, the user would state "POLO MERCHANDISE" after being prompted for a business services request. This vocal response is sent to the voice recognition server 24, which as previously set forth, processes the vocal response similar to other embodiments herein described.

As such, in our present example, a user of the second remote terminal 40 would be provided with a structured response from the location-based application server 28 that contained information relating to businesses that sell Polo merchandise in a geographic location that is relatively close to the second remote terminal 40. In fact, in every embodiment of the present invention, the user may also be given option of selecting a predetermined geographic radius for which they wish responses to be generated during operation. By way of example only, a respective user may only desire to obtain information on businesses located within 15 miles of the remote terminals 12, 40 and as such, may set a setting provided on the remote terminal 12, 40 that only allows responses to business services requests to be generated within a 15 mile radius of the remote terminal 12, 40.

Referring once again to FIG. 1, a wireless carrier 70 may also be connected to the data files 54–60 through a wireless carrier server 72. The wireless carrier server 72 is preferentially operable to monitor the data that is contained in the data files 54–60. As such, during operation of the location-based services system 10 the wireless carrier server 72 can update a subscriber data file 74 as users of the remote terminals 12, 40 access the location-based services system 10. This allows the wireless carrier 70 to keep track of the usage of the location-based services system 10 and may allow various charges to be applied to the user if applicable.

While the invention has been described in its currently best-known modes of operation and embodiments, other modes, embodiments and advantages of the present invention will be apparent to those skilled in the art and are contemplated herein.

What is claimed is:

1. A method of providing location-based services to a remote terminal in a wireless communication system, comprising the steps of:
    generating a text-based tailored request for information with said remote terminal, wherein said text-based tailored request for information comprises a non-predefined text based statement that is a question or a statement composed in a naturally written sentence;
    transmitting said text-based tailored request for information to a wireless application protocol server connected to said remote terminal using a wireless application protocol;
    interpreting said text-based tailored request for information with said wireless application protocol server generate a structured request that is sent to a location-based application server;
    obtaining a geographic indicator of said remote terminal with said location-based application server;
    processing said structured request with said location-based application server to generate a structured response to said structured request that is based on said geographic indicator of said remote terminal; and
    directing said structured response to said remote terminal.

2. The method of claim 1, wherein said text-based tailored request for information comprises a request for directory assistance including a first name and a last name of a person for which information has been requested.

3. The method of claim 1, wherein said text-based tailored request for information comprises a request about a respective business/service.

4. The method of claim 1, wherein said text-based tailored request for information comprises a request about a respective product.

5. The method of claim 1, further comprising the initial step of transmitting an open ended prompt to said remote terminal and receiving said text-based tailored request for information from said remote terminal in response to said open-ended prompt.

6. The method of claim 1, further comprising selective voice-based communication and generating a voice-based tailored request for information based on the structured response.

7. The method of claim 1, wherein obtaining said geographic indicator comprises receiving a geographic indicator from said remote terminal that has been preset by a user of said remote terminal to a desired geographic location.

8. The method of claim 1, wherein said text-based tailored request is generated extemporaneously by a user of said remote terminal.

9. A method of providing location-based services in a communication system that includes a plurality of remote terminals, the method comprising:
    transmitting an open-ended prompt for receipt by the remote terminal;
    a location-based services system receiving from a remote terminal an extemporaneous verbalization in response to the open-ended prompt, wherein the extemporaneous verbalization is a plurality of spoken words chosen by the speaker to convey an intended meaning;
    receiving a geographic indicator indicative of a geographic position;
    recognizing one or more words contained in the extemporaneous verbalization;
    determining a context of the recognized one or more words based on the extemporaneous verbalization;
    creating a structured request for information based on the recognized one or more words and the determined context; and
    generating a structured response to the extemporaneous verbalization with the location-based services system that is responsive to the structured request and is based on the geographic indicator.

10. The method of claim 9, wherein the extemporaneous verbalization consists of a plurality of spoken words that would be understood by a listener to be a request for information or a statement related to at least one of location-based goods or services or combinations thereof.

11. The method of claim 9, further comprising transmitting the structured response for receipt by said remote terminal.

12. The method of claim 9, wherein determining a context comprises interpreting the meaning of each of the recognized one or more words based on the extemporaneous verbalization.

13. The method of claim 9, wherein the extemporaneous verbalization is a request for a geographic location of a vendor of at least one of goods or services or combinations thereof.

14. The method of claim 9, wherein the structured response provides a location of a vendor of at least one of goods or services or combinations thereof that are in close proximity to the geographic position.

15. The method of claim 9, wherein the extemporaneous verbalization includes a designation of a geographic area and the structured response is based on the geographic indicator, the structured request and the designation of the geographic area.

16. The method of claim 9, wherein creating a structured request comprises indicating that a structured request is unavailable for the extemporaneous verbalization and generating a structured response comprises generating a structured response that is a prompt for input of a text message representative of the extemporaneous verbalization.

17. A location-based services system, comprising:
    a voice recognition server configured to receive a plurality of extemporaneously spoken words from a remote terminal in response to an open-ended prompt transmittable for receipt by the remote terminal;
    wherein the voice recognition server is configured to recognize terms from among the extemporaneously spoken words;
    a natural language processing server in communication with the voice recognition server, wherein the natural language processing server is configured to determine a context of the terms recognized by the voice recognition server and further configured to transform the terms and the determined context into a structured request; and a location-based application server in communication with the natural language processing server, wherein the location-based application server is configured to receive a geographic indicator and the structured request, the location-based application server is further configured to generate a structured response to the extemporaneously spoken words based on the geographic indicator and the structured request.

18. The location-based services system of claim 17, wherein the extemporaneously spoken words include a plurality of words that are ordered so as to be understood by a listener as a request for information or a statement related to at least one of location-based goods or services or combinations thereof.

19. The location-based services system of claim 17, wherein the location-based application server is further configured to transmit the structured response for receipt by a remote terminal.

20. The location-based services system of claim 17, wherein the natural language processing server is configured to interpret the meaning of each of the recognized terms based on the extemporaneously spoken words.

21. The location-based services system of claim 17, wherein the extemporaneously spoken words is a request for a geographic location of a vendor of at least one of goods or services or combinations thereof.

22. The location-based services system of claim 17, wherein the location-based application server is configured to generate a structured response that is a prompt for a text-based request when the natural language processing server is unable to transform the terms and the determined context into a structured request.

23. The location-based services system of claim 17, wherein the structured response provides a location of a vendor of at least one of goods or services or combinations thereof that is in close proximity to a geographic location indicated by the geographic indicator.

24. The location-based services system of claim 17, wherein the extemporaneously spoken words include a designation of a geographic area and the location-based application server is configured to generate the structured response based on the geographic indicator, the structured request and the designation of the geographic area.

25. A method of providing location-based services in a communication system that includes a plurality of remote terminals, the method comprising:

transmitting an open-ended prompt related to at least one of location-based goods or services or combinations thereof to a remote terminal;

receiving from the remote terminal a verbalization in response to the open-ended prompt, wherein the verbalization is a plurality of spoken words that would be recognized by a listener as some form of a response to the open-ended prompt;

receiving a geographic indicator indicative of a geographic location;

analyzing the verbalization to selectively identify a plurality of predetermined words that are included in the verbalization;

determining a meaning of each of the identified words based on the context of the verbalization;

transforming the identified words into a structured request that includes a predetermined structured request parameter based on the determined meaning of each of the identified words; and generating a structured response to the verbalization, wherein the structured response is generated based on the structured request and the geographic indicator.

26. The method of claim 25, further comprising transmitting the structured response for receipt by the remote terminal.

27. The method of claim 25, wherein the geographic indicator is a geographic location that is chosen with the remote terminal to be other than the current geographic location of the remote terminal.

28. The method of claim 25, wherein the verbalization includes a geographic radius surrounding the remote terminal, and the structured response is generated based on the geographic indicator, the structured request and the geographic radius.

29. The method of claim 25, wherein the open-ended prompt is a request for directory assistance, and the verbalization includes spoken words that are a last name and a first name of a person for which information has been requested.

30. The method of claim 29, wherein the request for directory assistance also includes a request for geographic information, and the verbalization also includes a spoken word that is indicative of geographic information that is said geographic indicator.

31. The method of claim 25, wherein the open-ended prompt is a request for a business request, and the verbalization is spoken words that form a request for specific information pertaining to at least one of a particular business or service or combinations thereof.

32. The method of claim 25, wherein the open-ended prompt is a request for a business request, and the verbalization is spoken words that form a request for specific information on a governmental agency, office, department, or person holding office or combinations thereof.

33. The method of claim 25, wherein the open-ended prompt is a request for a business request, and the verbalization is spoken words that form a request for information on at least one of a particular product, a brand of merchandise or a service or combinations thereof.

34. The method of claim 25, wherein receiving the geographic indicator comprises receiving a current geographic location of the remote terminal.

35. The method of claim 25, wherein receiving the geographic indicator comprises receiving an updated geographic indicator as the remote terminal changes geographic locations.

36. The method of claim 25, wherein the structured response comprises a voice signal.

37. A location-based services system, comprising:

a remote terminal configured to receive and provide an open-ended prompt to a user of the remote terminal, wherein the open-end prompt is related to at least one of location-based goods or services, or combinations thereof;

the remote terminal further configurable to transmit a verbalization in response to the open-ended prompt, wherein the verbalization is a plurality of extemporaneously spoken words that convey a question or a statement;

a voice recognition server configured to receive the verbalization and further configured to selectively identify terms from among the extemporaneously spoken words;

a natural language processing server in communication with the voice recognition server, wherein the natural language processing server is configured to determine a context of the terms identified by the voice recognition server and further configured to transform the terms and the determined context into a structured request; and a location-based application server in communication with the natural language processing server, wherein the location-based application server is configured to receive a geographic indicator and the structured request, the location-based application server is further configured to generate a structured response to the verbalization based on the geographic indicator and the structured request.

38. The location-based services system of claim 37, wherein the location-based application server is further configured to transmit the structured response to the remote terminal.

39. The location-based services system of claim 37, wherein the geographic indicator is a geographic location that is set with the remote terminal to be other than the current geographic location of the remote terminal.

40. The location-based services system of claim 37, wherein the verbalization includes a geographic radius surrounding the remote terminal and the location-based application server is further configured to generate the structured response based on the geographic indicator, the structured request and the geographic radius.

41. The location-based services system of claim 37, wherein the open-ended prompt is a request for directory assistance, and the verbalization includes spoken words that are a last name and a first name of a person for which information has been requested.

42. The location-based services system of claim 41, wherein the request for directory assistance also includes a request for geographic information, and the verbalization also includes a spoken word indicative of geographic information that is said geographic indicator.

43. The location-based services system of claim 37, wherein the open-ended prompt is a request for a business request, and the verbalization is spoken words that form a request for specific information pertaining to at least one of a particular business or service or combination thereof.

44. The location-based services system of claim 37, wherein the open-ended prompt is a request for a business request, and the verbalization is spoken words that form a request for specific information on a governmental agency, office, department, or person holding office.

45. The location-based services system of claim 37, wherein the open-ended prompt is a request for a business request, and the verbalization is spoken words that form a request for information on at least one of a particular product, a brand of merchandise or a service.

46. The location-based services system of claim 37, wherein the location-based application server is configured to receive a current geographic location of the remote terminal as the geographic indicator.

47. The location-based services system of claim 46, wherein the location-based application server is configured to receive an updated geographic indicator as the remote terminal changes geographic locations.

48. The location-based services system of claim 37, wherein the structured response comprises a voice signal.

49. The location-based services system of claim 37, wherein the verbalization comprises a request for information about at least one of a particular business or service or combination thereof that includes at least one of a business name, a business address, a type of business, a type of product, a type of service offered, a price range of products or a price range of services offered.

50. The location-based services system of claim 37, wherein the verbalization is a business request that is at least one of a request for information about at least one of a particular product or service or combinations thereof, a request for information on a brand of product, or a request for information on a type of at least one of a product or a service or a combination thereof.

51. The location-based services system of claim 37, wherein the geographic indicator is determined by a respective geographic location of the remote terminal.

52. The location-based services system of claim 37, wherein the remote terminal is a wireless communication device that is connected to a wireless communication system.

* * * * *

UNITED STATES PATENT AND TRADEMARK OFFICE
CERTIFICATE OF CORRECTION

PATENT NO. : 6,944,447 B2
DATED : September 13, 2005
INVENTOR(S) : Eric A. Portman et al.

It is certified that error appears in the above-identified patent and that said Letters Patent is hereby corrected as shown below:

Title page,
Item [60], Related U.S. Application Data, change "60/286,196" to -- 60/286,916 --.

Column 1,
Line 4, change "60/286,196" to -- 60/286,916 --.

Column 19,
Line 32, after "server" insert -- to --.
Line 57, change "selective" to -- selecting --.

Signed and Sealed this

Eighth Day of November, 2005

JON W. DUDAS
*Director of the United States Patent and Trademark Office*